(12) United States Patent
Wu et al.

(10) Patent No.: US 9,999,851 B2
(45) Date of Patent: Jun. 19, 2018

(54) FILTER MOUNTING STRUCTURE

(71) Applicants: Panasonic Ecology Systems Guangdong Co., Ltd., Foshan, Guangdong (CN); Panasonic Corporation, Osaki (JP)

(72) Inventors: Kunran Wu, Guangdong (CN); Longchang Yu, Guangdong (CN); Norihiko Hasegawa, Aichi (JP); Soma Hara, Aichi (JP)

(73) Assignees: PANASONIC ECOLOGY SYSTEMS GUANGDONG CO., LTD., Foshan, Guangdong (CN); PANASONIC CORPORATION, Osaka (JP)

( * ) Notice: Subject to any disclaimer, the term of this patent is extended or adjusted under 35 U.S.C. 154(b) by 107 days.

(21) Appl. No.: 15/357,194

(22) Filed: Nov. 21, 2016

(65) Prior Publication Data

US 2017/0151519 A1 Jun. 1, 2017

(30) Foreign Application Priority Data

Nov. 27, 2015 (CN) ..................... 2015 2 0971581 U (51) Int. Cl.
*B01D 46/00* (2006.01)
(52) U.S. Cl.
CPC ................ *B01D 46/0006* (2013.01)
(58) Field of Classification Search
CPC ................................................ B01D 46/0006
See application file for complete search history.

(56) References Cited

U.S. PATENT DOCUMENTS

| 4,435,197 | A | * | 3/1984 | Nijhawan | .......... | B01D 46/0006 55/341.7 |
| 4,773,922 | A | * | 9/1988 | Ross | .................. | B01D 46/0004 55/481 |
| 6,808,547 | B2 | * | 10/2004 | Ota | ..................... | B01D 46/0006 55/478 |
| 7,465,327 | B2 | * | 12/2008 | Jang | ................... | B01D 46/0006 55/385.1 |
| 7,641,707 | B2 | * | 1/2010 | Kang | ................. | B01D 46/0006 55/385.1 |
| 8,597,390 | B2 | * | 12/2013 | Aizawa | .............. | B01D 46/0006 55/481 |
| 9,079,130 | B2 | * | 7/2015 | Kim | ................... | B01D 46/0005 |
| 2004/0020177 | A1 | * | 2/2004 | Ota | .................... | B01D 46/0006 55/481 |

(Continued)

*Primary Examiner* — Amber R Orlando
*Assistant Examiner* — Britanny Precht
(74) *Attorney, Agent, or Firm* — RatnerPrestia (57) ABSTRACT

A filter mounting structure, includes a casing including upper, lower, front, back, left and right side panels and a filter unit. The filter unit includes a filter, a first support frame located at a front end of the filter, and a second support frame located at a side of the filter. The filter is mounted on the first and second support frames. A first mounting port is provided in the front side panel and a second mounting port is provided in any one of the left and right side panels. A mounting space is included in the casing and extends toward the first and second mounting ports respectively. The first support frame is mounted on the front side panel of the casing through the first mounting port and the second support frame is mounted on the left or right side panel of the casing through the second mounting port.

8 Claims, 10 Drawing Sheets

(56) References Cited

U.S. PATENT DOCUMENTS

2008/0216455 A1\* 9/2008 Aizawa ............. B01D 46/0006
 55/481
2013/0160410 A1\* 6/2013 Kim .................. B01D 46/0005
 55/385.4

\* cited by examiner

FILTER MOUNTING STRUCTURE

CROSS REFERENCE TO RELATED APPLICATIONS

This Application claims priority to Chinese Application No. 201520971581.3, filed on Nov. 27, 2015, incorporated herein by reference in its entirety.

TECHNICAL FIELD

Embodiments of the present disclosure relate to a filter mounting structure.

BACKGROUND

Figure 1:
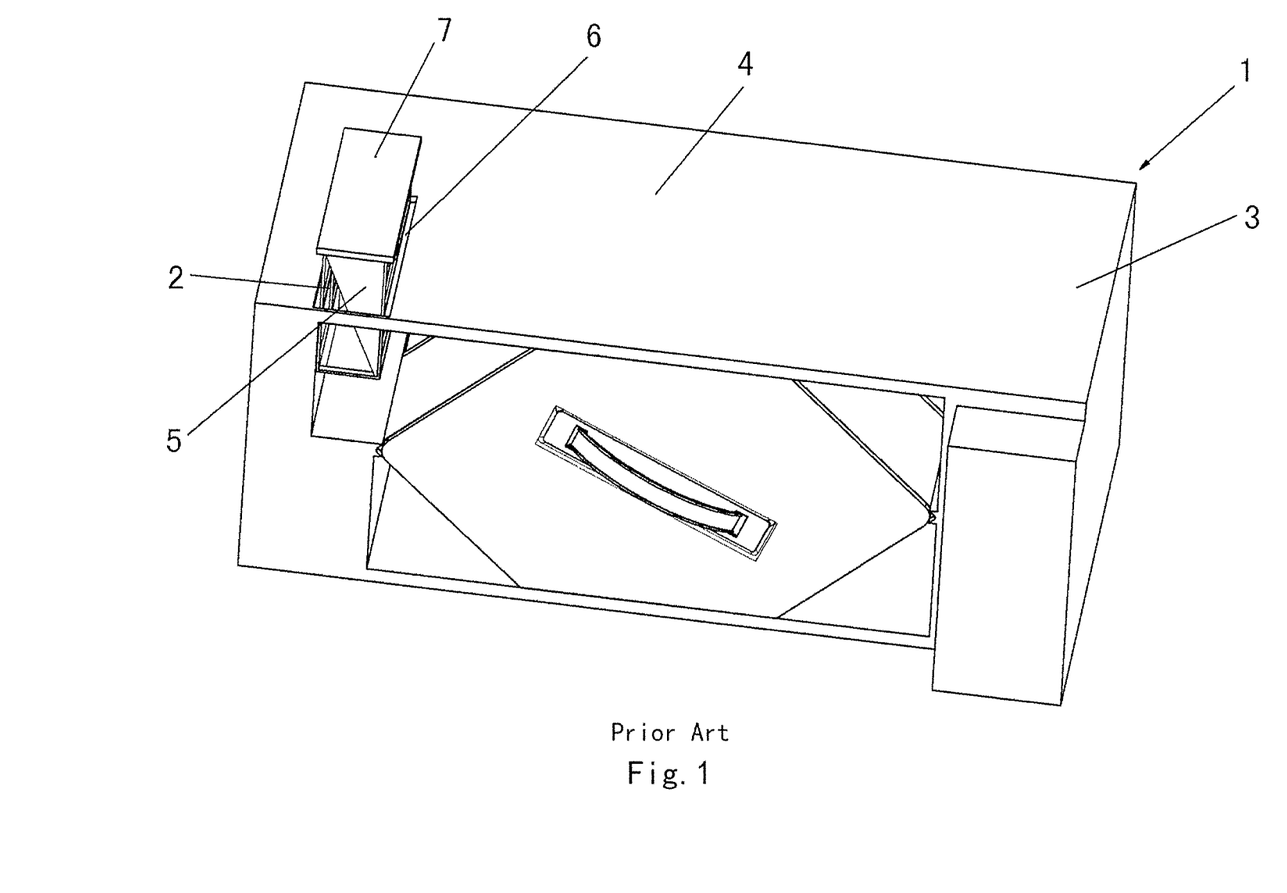
FIG. 1 is a schematic view of a known technique.

FIG. 1 is a schematic view of a known technique. Taking a filter mounting structure of an conventional heat exchange device as an example, as shown in FIG. 1, a casing 3 of the heat exchange device 1 comprises of an upper, a lower, a front, a back, a left and a right side panels. The heat exchange device 1 may be mounted on the wall directly. A filter 2 is placed in a filter placing frame 5, and a mounting opening 6 for the filter placing frame 5 and a cover 7 which is fixed on the mounting opening 6 with screws are formed in the front side panel 4 of the casing 3. The filter placing frame 5 and the cover 7 can be fixed together. When the filter 2 needs to be washed or changed, the screws are removed firstly, and then the cover 7 and the filter placing frame 5 can be taken out through the mounting opening 6.

When an obstacle such as an interior furniture, is placed in the way ahead of the cover 7, it is necessary to move away the obstacle and then perform an operation. It is also possible to remove a side panel from one side of the casing and then take out the filter placing frame 5. However, no matter which method is used, there are too many steps and the operation is inconvenient.

SUMMARY

Accordingly, it is an object of the present disclosure to provide a filter mounting structure by which the filter can be mounted and demounted conveniently.

In order to achieve above mentioned object, there is provided a filter mounting structure comprising a casing including an upper, a lower, a front, a back, a left and a right side panels and a filter unit provided in the casing. The filter unit includes a filter, a first support frame which is located at a front end of the filter, and a second support frame which is located at a side of the filter and is perpendicular to the first support frame, the filter being mounted on the first and second support frames. A first mounting port is provided on the front side panel of the casing and a second mounting port is provided on any one of the left and right side panels. A mounting space is included in the casing and extends toward the first and second mounting ports respectively. The filter is capable of sliding in the mounting space. The first support frame is mounted on the front side panel of the casing through the first mounting port and the second support frame is mounted on the left or right side panel of the casing through the second mounting port.

The embodiments of the present disclosure have an advantage that the filter may be mounted and demounted conveniently.

DETAILED DESCRIPTION OF PREFERRED EMBODIMENTS OF THE INVENTION

Figure 2A:
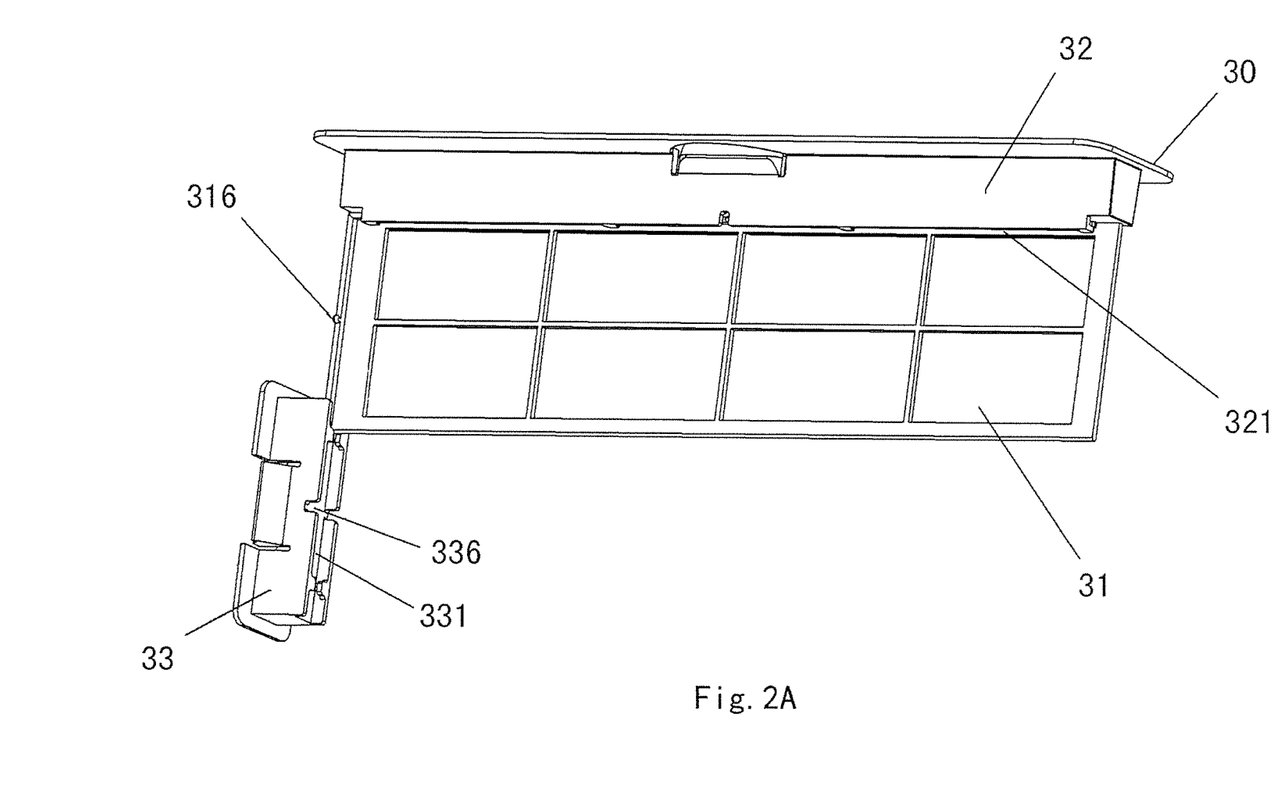
FIG. 2A is a schematic view of a filter unit of an embodiment of the present invention.
Figure 2B:
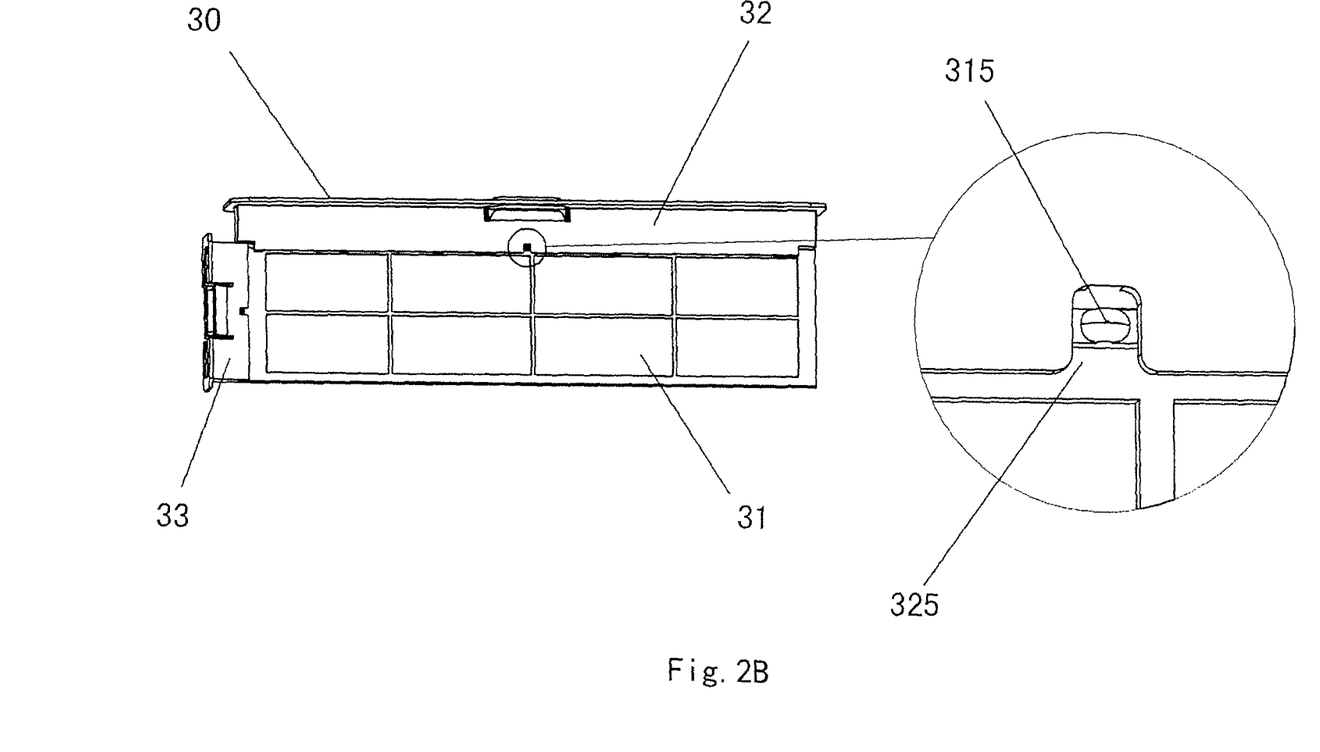
FIG. 2B is another schematic view of the filter unit according to the embodiment of the present invention.
Figure 3:
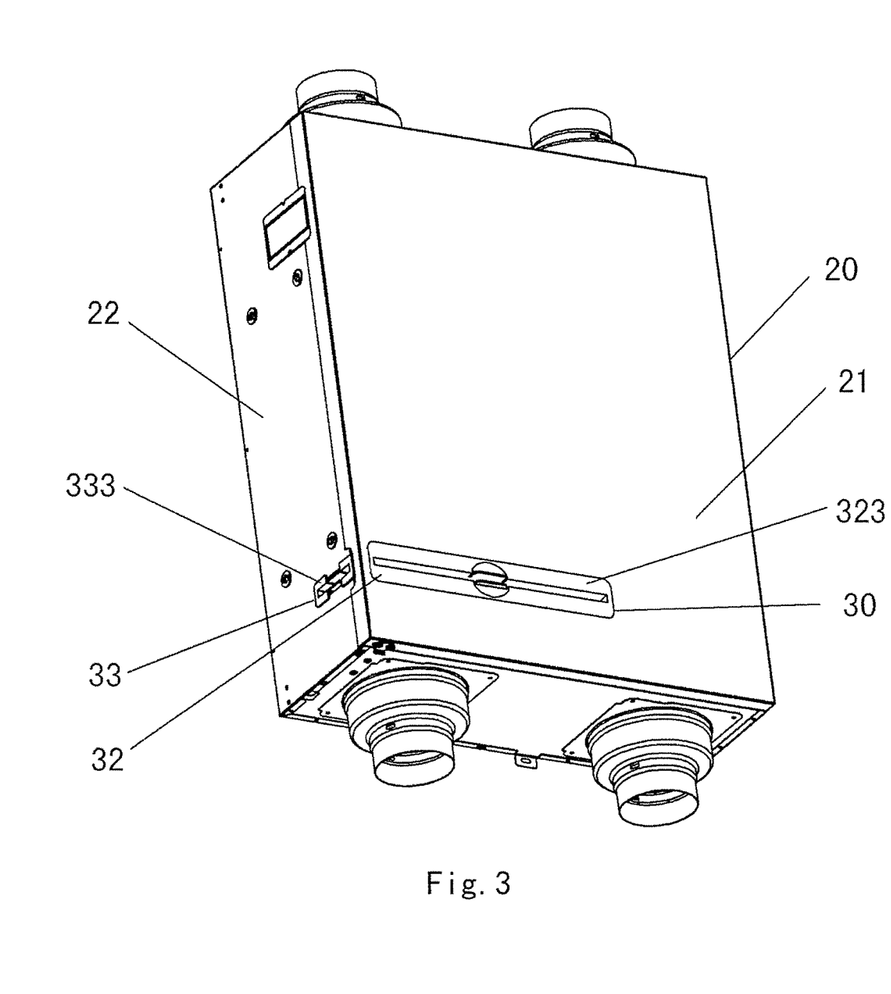
FIG. 3 is a schematic view showing the filter unit being mounted on a casing according to the embodiment of the present invention.
Figure 4:
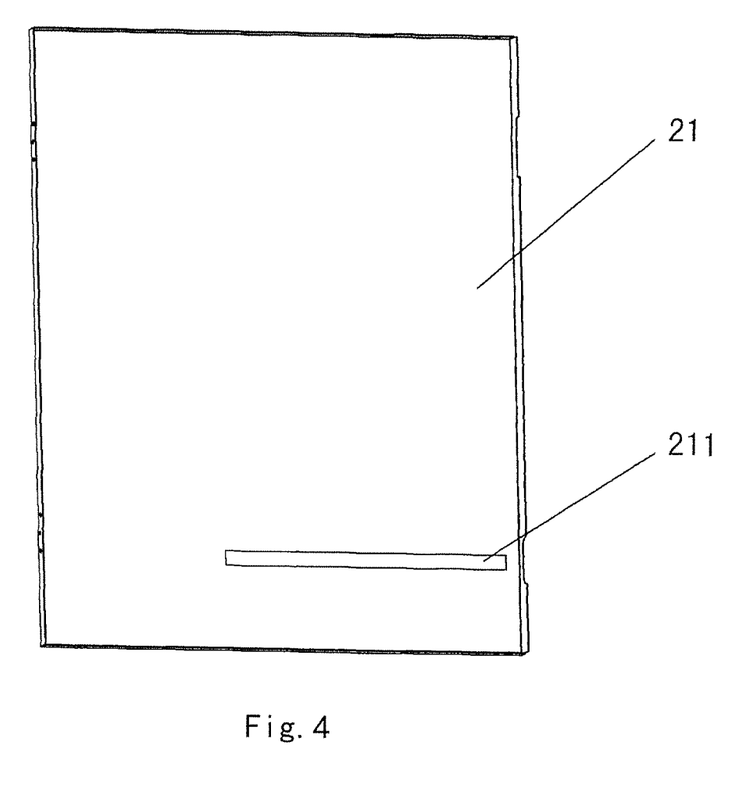
FIG. 4 is a schematic view of a front side panel of the casing according to the embodiment of the present invention.
Figure 5:
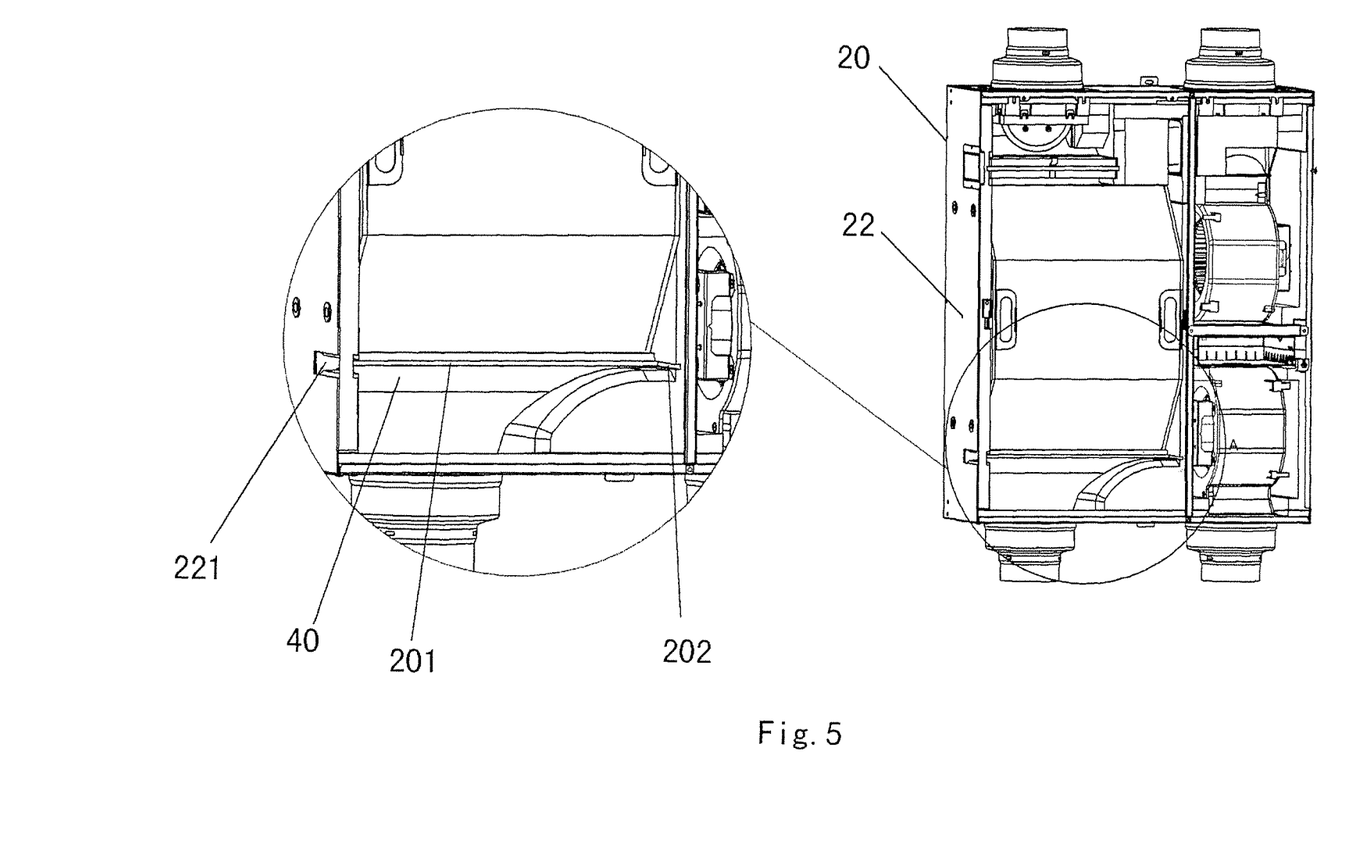
FIG. 5 is a schematic view of an interior of the casing when the filter unit is not mounted according to the embodiment of the present invention.

FIG. 2A is a schematic view of a filter unit of an embodiment of the invention. FIG. 2B is another schematic view of the filter unit according to the embodiment of the invention; FIG. 3 is a schematic view of the filter unit being mounted on the casing according to the embodiment of the present invention; FIG. 4 is a schematic view of the front side panel of the casing according to the embodiment of the present invention; FIG. 5 is a schematic view of the interior of the casing when the filter unit is not mounted according to the embodiment of the present invention.

As shown in FIGS. 2A-5, a filter mounting structure of the present embodiment comprises a casing 20 including of an upper side panel, a lower side panel, a front side panel 21, a back side panel, a left side panel 22 and a right side panel, and a filter unit 30 provided in the casing 20. The filter unit 30 includes a filter 31, a first support frame 32 which is located at a front end of the filter 31, and a second support frame 33 which is located at a left side of the filter 31 and is perpendicular to the first support frame 32. The filter 31 is mounted on the first and second support frames 32, 33. A first mounting port 211 is provided in the front side panel 21 of the casing 20 and a second mounting port 221 is provided in the left side panel 22. A mounting space 40 is included in the casing 20 and extends toward the first and second mounting ports 211, 221 respectively. The filter 31 is capable of sliding in the mounting space 40, so that the filter 31 may be completely provided in the mounting space 40, and may filter the air that flows through.

The first support frame 32 is mounted on the front side panel 21 of the casing 20 through the first mounting port 211 and the second support frame 33 is mounted on the left side panel 22 of the casing 20 through the second mounting port 221.

In the description of the present disclosure, the orientation or positional relationship indicated by the terms "front", "back", "upper", "lower", "left", "right" and the like is based on the orientation or positional relationship shown in FIG. 3, which is intended to facilitate the description of the present disclosure rather than to mean that the device or component in question must have a particular orientation and therefore it cannot be construed as limiting the scope of the present disclosure.

Further, in the present embodiment, the second mounting port 221 being provided in the left side panel 22 is taken as an example. The second mounting port may be provided in the right side panel according to an actual need. Actually, if a filter is provided elsewhere in the casing 20, it may also be mounted with the structure of the present disclosure.

Figure 6:
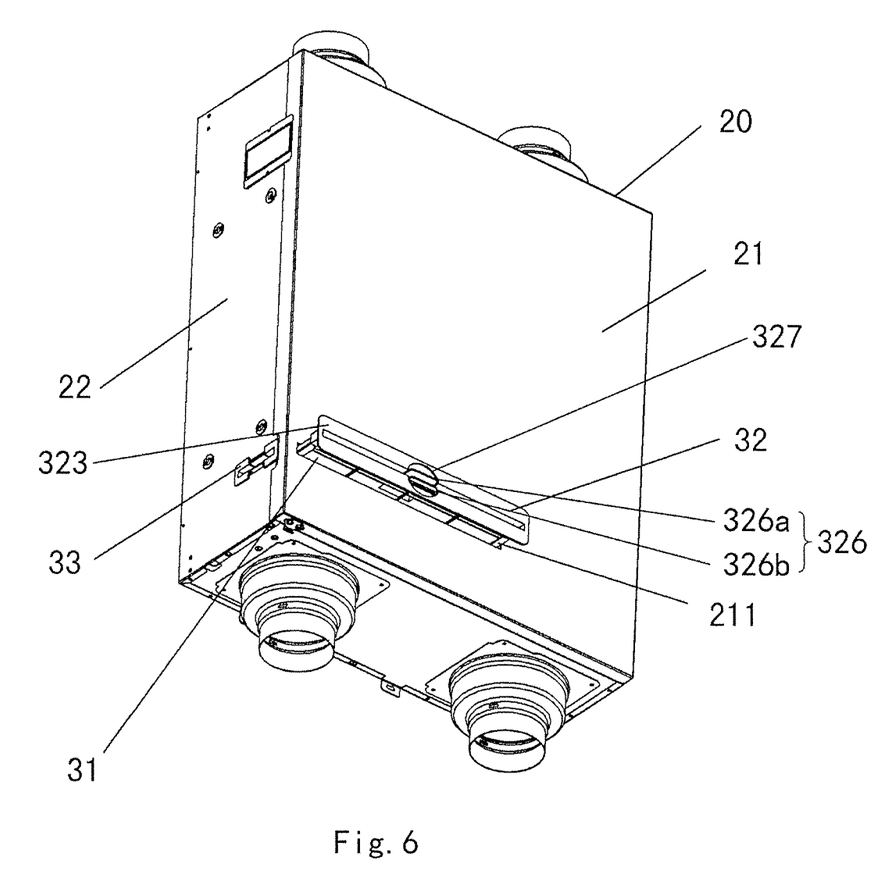
FIG. 6 is a schematic view showing that the filter is mounted in (or taken out of) the first mounting port according to the embodiment of the present invention.
Figure 7:
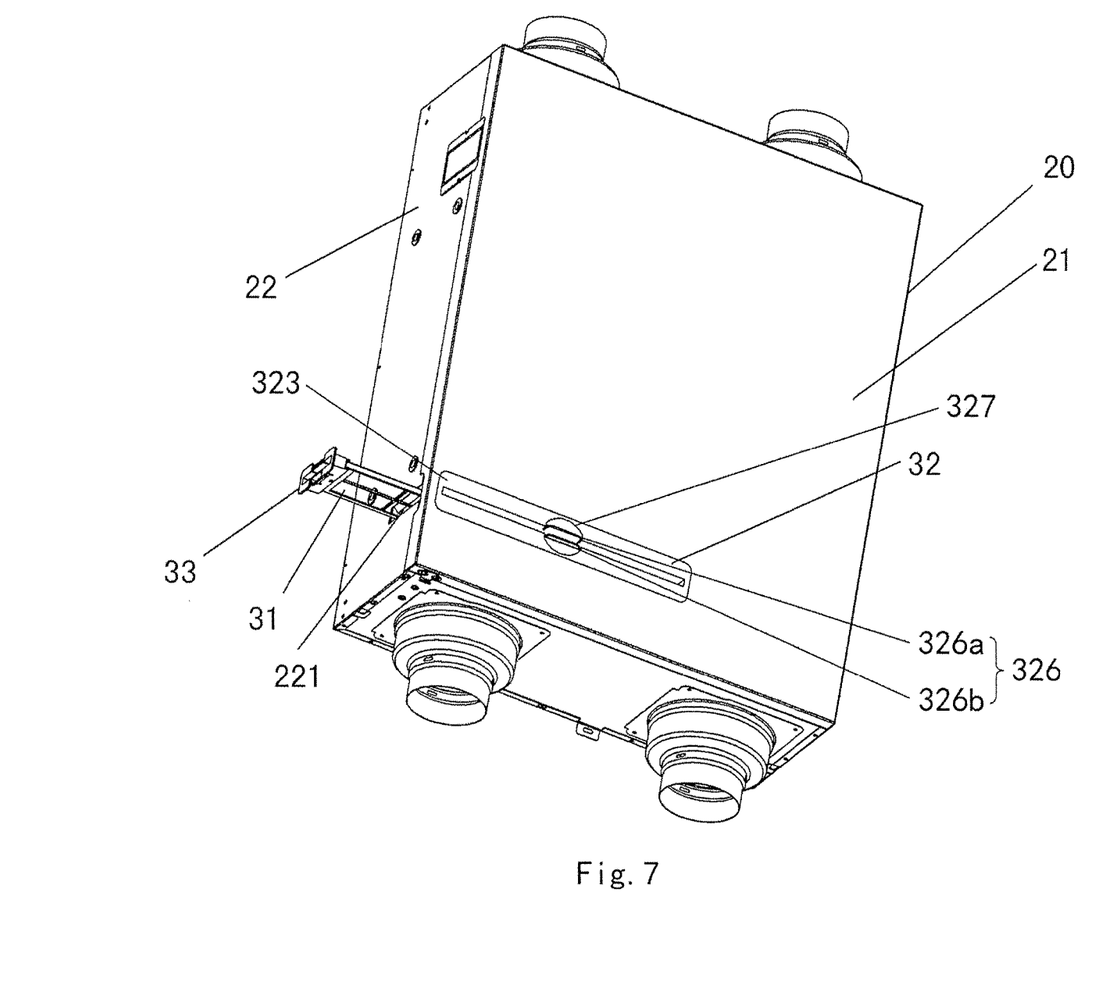
FIG. 7 is a schematic view showing that the filter is mounted in (or taken out of) the second mounting port according to the embodiment of the present invention.

FIG. 6 is a schematic view showing that the filter of the embodiment is mounted in (or taken out of) the first mounting port, and FIG. 7 is a schematic view showing that the filter of the embodiment is mounted in (or taken out of) the second mounting port.

As shown in FIGS. 6 and 7, if the filter 31 needs to be cleaned or changed, it can slide out of the mounting space 40 (shown in FIG. 5) and withdrawn out of the casing 20 through the first mounting port 211 in the front side panel 21 or the second mounting port 221 in the left side panel 22. That is to say, the filter 31 may be drawn out in two directions from the front side panel 21 and the left side panel 22. If there is an obstacle in front of the frond side panel 21 of the casing 20, the filter 31 can be drawn out from the left side panel 22 of the case 20; while if there is an obstacle in front of the left side panel 22 of the casing 20, the filter 31 can be drawn out from the front side panel 21 of the case 20. It doesn't need to move the obstacle and thus improve the convenience in mounting and demounting the filter 31.

Further, the first support frame 32 is mounted on the front side panel 21 of the casing 20 through the first mounting port 211 and the second support frame 33 is mounted on the left side panel 22 of the casing 20 through the second mounting port 221. That is to say, because the first and second support frame 32, 33 pass through the first mounting port 211 and the second mounting port 221 respectively and protrude from the surface of the casing 20, the first and second support frames 32, 33 may be drawn out from outside of the casing 20, and then the filter 31 can be taken out, even if the front side panel 21 or the left side panel 22 is not opened.

Figure 8:
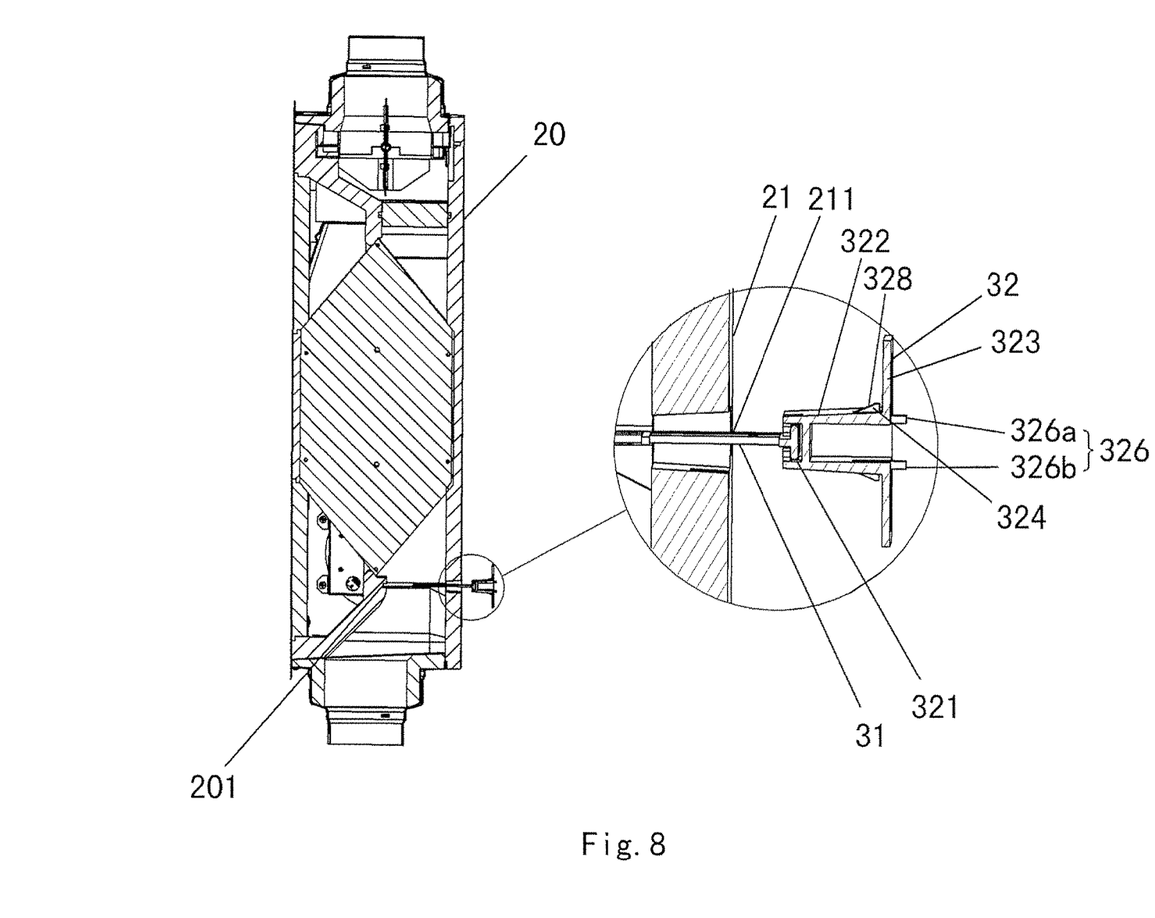
FIG. 8 is a sectional view showing that the filter is mounted in (or taken out of) the first mounting port according to an embodiment of the present invention.
Figure 9:
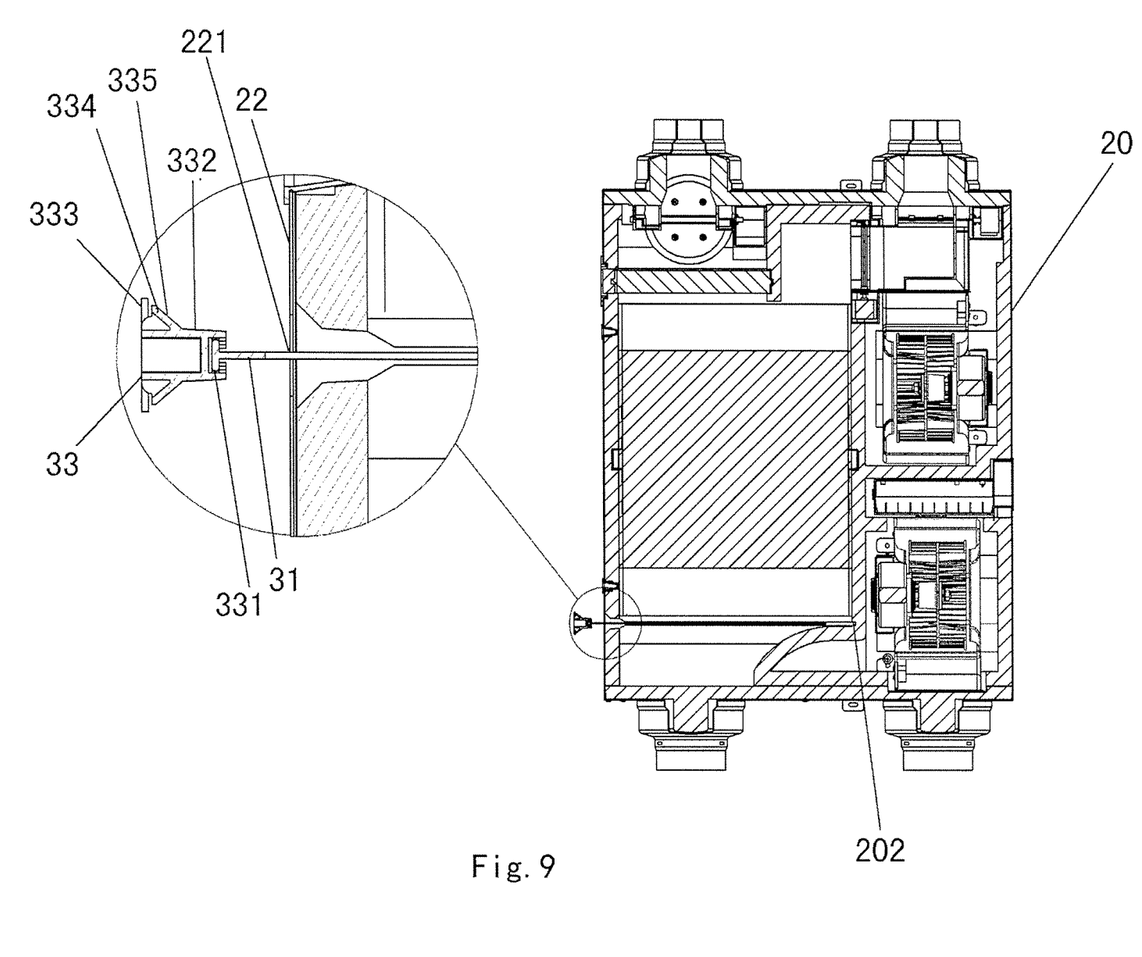
FIG. 9 is a sectional view showing that the filter is mounted in (or taken out of) the second mounting port according to the embodiment of the present invention.

FIG. 8 is a sectional view showing that the filter is mounted in (or taken out of) the first mounting port; and FIG. 9 is a sectional view showing that the filter is mounted in (or taken out of) the second mounting port.

As shown in FIGS. 5-9, a first guide rail 321 is formed on the first supporting frame 32 and a first recess 201 is provided inside the casing 20 at a position opposite to the first guide rail 321; a second guide rail 331 is formed on the second supporting frame 33 and a second recess 202 is provided inside the casing 20 at a position opposite to the second guide rail 331. The filter 31 slides along the second guide rail 331 and the second recess 202 when being mounted or demounted through the first mounting port 211, and the filter 31 slides along the first guide rail 321 and the first recess 201 when being mounted or demounted from the second mounting port 221.

With above structure, when the filter 31 is taken out from the left side of the casing 20, the filter 31 slides towards the outside of the casing 20 between the first guide rail 321 and the first recess 201, and slides out through the left side panel 22 of the casing 20 via the second mounting port 221 of the left side panel 22.

When the filter 31 is mounted from the left side of the casing 20, the filter 31 enters the casing 20 through the left side panel 22 of the casing 20 via the second mounting port 221 of the left side panel 22, and slides between the first guide rail 321 and the first recess 201 until the filter 31 is completely provided in the mounting space 40.

When the filter 31 is taken out from the front side of the casing 20, the filter 31 slides towards the outside of the casing 20 between the second guide rail 331 and the second recess 202, and slides out through the front side panel 21 of the casing 20 via the first mounting port 211 of the front side panel 21.

When the filter 31 is mounted from the front side of the casing 20, the filter 31 enters the casing 20 through the front side panel 21 of the casing 20 via the first mounting port 211 of the front side panel 21, and slides between the second guide rail 331 and the second recess 202 until the filter 31 is completely provided in the mounting space 40.

Further, as shown in FIGS. 8 and 9, a first elastic piece 322 is extended from both side walls of the first guide rail 321 in a direction toward the outside of the casing 20. A first extension piece 323 parallel to the front side panel 21 and a first protrusion 324 which is closer to the inside of the casing 20 than the first extension piece 323 are provided on the first elastic piece 322, and a first inclined plane 328 is formed on the first protrusion 324.

A second elastic piece 332 is extended from both side walls of the second guide rail 331 in a direction toward the outside of the casing 20. A second extension piece 333 parallel to the left side panel 22 and a second protrusion 334 which is closer to the inside of the casing 20 than the second extension piece 333 are provided on the second elastic piece 332, and a second inclined plane 335 is formed on the second protrusion 334.

With above mentioned structure, when the filter 31 is mounted from the left side of the casing 20, the filter 31 is firstly snapped into the second guide rail 331 so that the filter 31 and the second support frame 33 are connected together. Then the filter 31 and the second support frame 33 are inserted into the casing 20 through the second mounting port 221. Because the second protrusion 334 is closer to the inside of the casing 20, the second protrusion 334 firstly touches the left side panel 22 of the casing 20. When the second protrusion 334 contacts the left side panel 22 of the casing 20, the second inclined plane 335 of the second protrusion 334 is pressed by the wall of the second mounting port 221 and deforms towards the interior of the second mounting port 221. Therefore, the second protrusion 334 may pass through the second mounting port 221 along its second inclined plane 335. After the second protrusion 334 passes through the second mounting port 221, the second protrusion 334 is not pressed by the wall of the second mounting port 221 and recovers to its original shape, so as to clamp the left side panel 22 of the casing 20 from interior of the casing 20, so that the filter 31 and the second support frame 33 will not fall out of the casing 20.

Further, the second extension piece 333 parallel to the left side panel 22 clamps the left side panel 22 of the casing 20 from outside of the casing 20, so that the filter 31 and the second support frame 33 will not continue to move to interior of the casing 20. That is to say, the second protrusion 334 and the second extension piece 333 sandwich the left side panel 22 of the casing 20, so that the filter 31 and the second support frame 33 are positioned in place.

When the filter 31 is taken out from the left side of the casing 20, as the second elastic piece 332 has elasticity, the two second elastic pieces 332 may be forced to come close to each other. The second protrusion 334 will be released from the second mounting port 221 as the second elastic pieces 332 come close to inside of the mounting port 221, and then the filter 31 is released from the casing 20.

When the filter 31 is mounted and demounted in the front side of the casing 20, the first elastic piece 322, the first extension piece 323 and the first protrusion 324 are utilized, the method and the principle are similar with that of the filter 31 being mounted and demounted from the left side of the casing 20, which will not be repeated here.

Further as shown in FIGS. 6-8, a cut portion 327 which is cut out is provided in the first extension piece 323, and on the first elastic piece 322, a handle 326 including two lugs 326a, 326b is provided at a position of the cut portion 327. In this way, the position of the first protrusions 321 can be moved by decreasing a distance between the two lugs 326a, 326b, so that the filter 31 can be taken out of the first mounting port 211.

Further, two handles 326 may be provided on the first elastic pieces 322. By providing two handles 326, both hands can be used to grasp the handles 326. It will be easier to take out the filter 31 than in the case of taking out the filter 31 by grasping the handle 326 with a single hand. It will thus improve maintenance of the filter 31.

Further as shown in FIGS. 2A and 2B, a first notch 325 is provided in the first guide rail 321, and a first bump 315 which may be snapped into the first notch 325 is provide at a position of the filter 31 corresponding to the first notch 325.

With above mentioned structure, when the filter 31 is snapped into the first guide rail 321 from a side of the first guide rail 321, the first bump 315 is forced to snap into the first notch 325. In this way, the filter 31 will be clamped and will not slide freely in the first guide rail 321 and fall onto the user, when the first support frame 32 and the filter 31 are taken out from the front side of the casing 20. Further, the filter 31 will not slide freely in the first guide rail 321 so that it is hard to align with the first mounting port 211, when the first support frame 32 and the filter 31 are inserted into the front side panel 21.

A second notch 336 is provided in the second guide rail 331, and a second bump 316 is provide at a position of the filter 31 corresponding to the second notch 336.

With above mentioned structure, when the filter 31 is snapped into the second guide rail 331 from a side of the second guide rail 331, the second bump 316 is forced to snap into the second notch 336. In this way, the filter 31 will be clamped and will not slide freely in the second guide rail 331 and fall onto the user, when the second support frame 33 and the filter 31 are taken out from the left side of the casing 20. Further, the filter 31 will not slide freely in the second guide rail 331 so that it is hard to align with the second mounting port 221, when the second support frame 33 and the filter 31 are inserted into the left side panel 22.

What is claimed is:

1. A filter mounting structure comprises:
   a casing comprising an upper, a lower, a front, a back, a left and a right side panels, and a filter unit provided in the casing, wherein,
   the filter unit comprises a filter, a first support frame which is located at a front end of the filter, and a second support frame which is located at a side of the filter and is perpendicular to the first support frame, the filter being mounted on the first and second support frames,
   a first mounting port is provided in the front side panel of the casing and a second mounting port is provided in any one of the left and right side panels, a mounting space being included in the casing and extending toward the first and second mounting ports respectively, the filter being capable of sliding in the mounting space,
   the first support frame is mounted on the front side panel of the casing through the first mounting port and the second support frame is mounted on the left or right side panel of the casing through the second mounting port.

2. The filter mounting structure according to claim 1, wherein a first guide rail is formed on the first supporting frame and a first recess is provided inside the casing at a position opposite to the first guide rail;
   a second guide rail is formed on the second supporting frame and a second recess is provided inside the casing at a position opposite to the second guide rail; and
   the filter slides along the second guide rail and the second recess when being mounted or demounted from the first mounting port, and the filter slides along the first guide rail and the first recess when being mounted or demounted from the second mounting port.

3. The filter mounting structure according to claim 2, wherein a first elastic piece is extended from both side walls of the first guide rail in a direction toward an outside of the casing, a first extension piece parallel to the front side panel and a first protrusion which is closer to the inside of the casing than the first extension piece are provided on the first elastic piece, and a first inclined plane is formed on the first protrusion; and
   a second elastic piece is extended from both side walls of the second guide rail in a direction toward the outside of the casing, a second extension piece parallel to the left or right side panel and a second protrusion which is closer to the inside of the casing than the second extension piece are provided on the second elastic piece, and a second inclined plane is formed on the second protrusion.

4. The filter mounting structure according to claim 3, wherein a cut portion which is cut out is provided in the first extension piece,
   on the first elastic piece, a handle comprising two lugs is provided at a position of the cut portion,
   the position of the first protrusion is able to be moved by decreasing a distance between the two lugs, so that the filter is able to be taken out of the first mounting port.

5. The filter mounting structure according to claim 4, wherein two handles are provided.

6. The filter mounting structure according to claim 2, wherein a first notch is provided in the first guide rail, and a first bump which may be snapped into the first notch is provide at a position of the filter corresponding to the first notch.

7. The filter mounting structure according to claim 2, wherein a second notch is provided in the second guide rail, and a second bump which may be snapped into the second notch is provide at a position of the filter corresponding to the second notch.

8. The filter mounting structure according to claim 6, wherein a second notch is provided in the second guide rail, and a second bump which may be snapped into the second notch is provide at a position of the filter corresponding to the second notch.

* * * * *